United States Patent
Sikorski et al.

(10) Patent No.: US 12,147,230 B2
(45) Date of Patent: Nov. 19, 2024

(54) METHOD AND APPARATUS FOR SELECTIVE DRIVE-MODE ENABLEMENT

(71) Applicant: FORD GLOBAL TECHNOLOGIES, LLC, Dearborn, MI (US)

(72) Inventors: Ryan Sikorski, Canton, MI (US); Christian Edward Shaffer, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 473 days.

(21) Appl. No.: 17/475,536

(22) Filed: Sep. 15, 2021

(65) Prior Publication Data

US 2022/0004189 A1   Jan. 6, 2022

Related U.S. Application Data

(63) Continuation of application No. 15/934,142, filed on Mar. 23, 2018, now Pat. No. 11,137,757.

(51) Int. Cl.
  *G05D 1/00* (2024.01)
  *B60W 30/02* (2012.01)
(52) U.S. Cl.
  CPC ........... *G05D 1/0061* (2013.01); *B60W 30/02* (2013.01)
(58) Field of Classification Search
  CPC ................................. G05D 1/80; G05D 1/82
  See application file for complete search history.

(56) References Cited

U.S. PATENT DOCUMENTS

| | | | |
|---|---|---|---|
| 8,306,728 B2 | 11/2012 | Miller et al. | |
| 9,342,074 B2 | 5/2016 | Dolgov et al. | |
| 9,348,492 B1* | 5/2016 | Penilla | G06F 3/04842 |
| 9,475,496 B2 | 10/2016 | Attard et al. | |
| 9,663,117 B2 | 5/2017 | Cullinane et al. | |
| 9,684,306 B2 | 6/2017 | Sprigg | |
| 2007/0015812 A1 | 1/2007 | Gratz et al. | |
| 2011/0231049 A1 | 9/2011 | Le Brusq et al. | |
| 2014/0282931 A1* | 9/2014 | Protopapas | B60R 25/2081 726/5 |
| 2015/0300312 A1 | 10/2015 | Ferguson et al. | |
| 2016/0167653 A1 | 6/2016 | Malone et al. | |
| 2016/0264147 A1 | 9/2016 | Mueller et al. | |
| 2017/0038773 A1 | 2/2017 | Gordon et al. | |
| 2018/0194340 A1 | 7/2018 | Collins et al. | |
| 2018/0194341 A1 | 7/2018 | Owen et al. | |
| 2019/0243360 A1 | 8/2019 | Uetani et al. | |
| 2019/0256071 A1 | 8/2019 | Dhingra et al. | |
| 2019/0278271 A1 | 9/2019 | Blumer et al. | |

FOREIGN PATENT DOCUMENTS

DE   102016010021 A1   4/2017

* cited by examiner

*Primary Examiner* — Christian Chace
*Assistant Examiner* — Katherine Marie Fitzharris
(74) *Attorney, Agent, or Firm* — Joseph Zane; Brooks Kushman P.C.

(57) ABSTRACT

A system includes a processor configured to determine a driver identity. The processor is also configured to receive a request for a change to a driving mode and responsive to the request, enable or deny the driving mode based on mode-correlation to one of a predefined set of permissible driving modes pre-associated with the driver identity.

17 Claims, 7 Drawing Sheets

METHOD AND APPARATUS FOR SELECTIVE DRIVE-MODE ENABLEMENT

CROSS-REFERENCE TO RELATED APPLICATIONS

This application is a continuation of U.S. application Ser. No. 15/934,142 filed Mar. 23, 2018, now U.S. Pat. No. 11,137,757, issued Oct. 5, 2021, the disclosure of which is hereby incorporated in its entirety by reference herein.

TECHNICAL FIELD

The illustrative embodiments generally relate to methods and apparatuses for selective drive-mode enablement.

BACKGROUND

Improvements to onboard computing capability and vehicle mechanics present opportunities for increased variances in vehicle driving modes. In addition to more traditional driving modes, such as four-wheel drive (4WD) and all-wheel drive (AWD), drivers may be able to select from more environmentally specific driving modes, such as sand, gravel, snow and ice, etc. Advanced performance vehicles may also include modes such as drift mode, usable for a highly specific form of driving called "drifting," or "line lock" mode, which allows drivers to spin the rear tires to produce noise and smoke.

In a similar vein, drivers of autonomous or partially autonomous vehicles may wish to switch between automated and manually controlled driving or driving assisted conditions. Skilled drivers may want to freely switch between all possible modes, but at the same time parents or people loaning out vehicles may not want to run the risk of an unskilled or little-known driver using a vehicle in a mode that can be unfavorable to both the occupants and the vehicle when used incorrectly.

SUMMARY

In a first illustrative embodiment, a system includes a processor configured to determine a driver identity. The processor is also configured to receive a request for a change to a driving mode and responsive to the request, enable or deny the driving mode based on mode correlation to one of a predefined set of permissible driving modes pre-associated with the driver identity.

In a second illustrative embodiment, a computer-implemented method includes disabling a driving mode subset of possible driving modes, responsive to driver identification and based on a predefined subset pre-associated with an identified driver's profile. The method also includes selectively denying a request for disabled driving modes when a valid override condition does not accompany the request.

In a third illustrative embodiment, a system includes a processor configured to detect a vehicle driver identity. The processor is also configured to load a profile associated with the driver identity, the profile including a defined set of enabled and disabled driving modes for an identified driver and process driving control mode change requests in accordance with the defined set, such that changes to enabled driving modes are permitted and changes to disabled driving modes are rejected.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
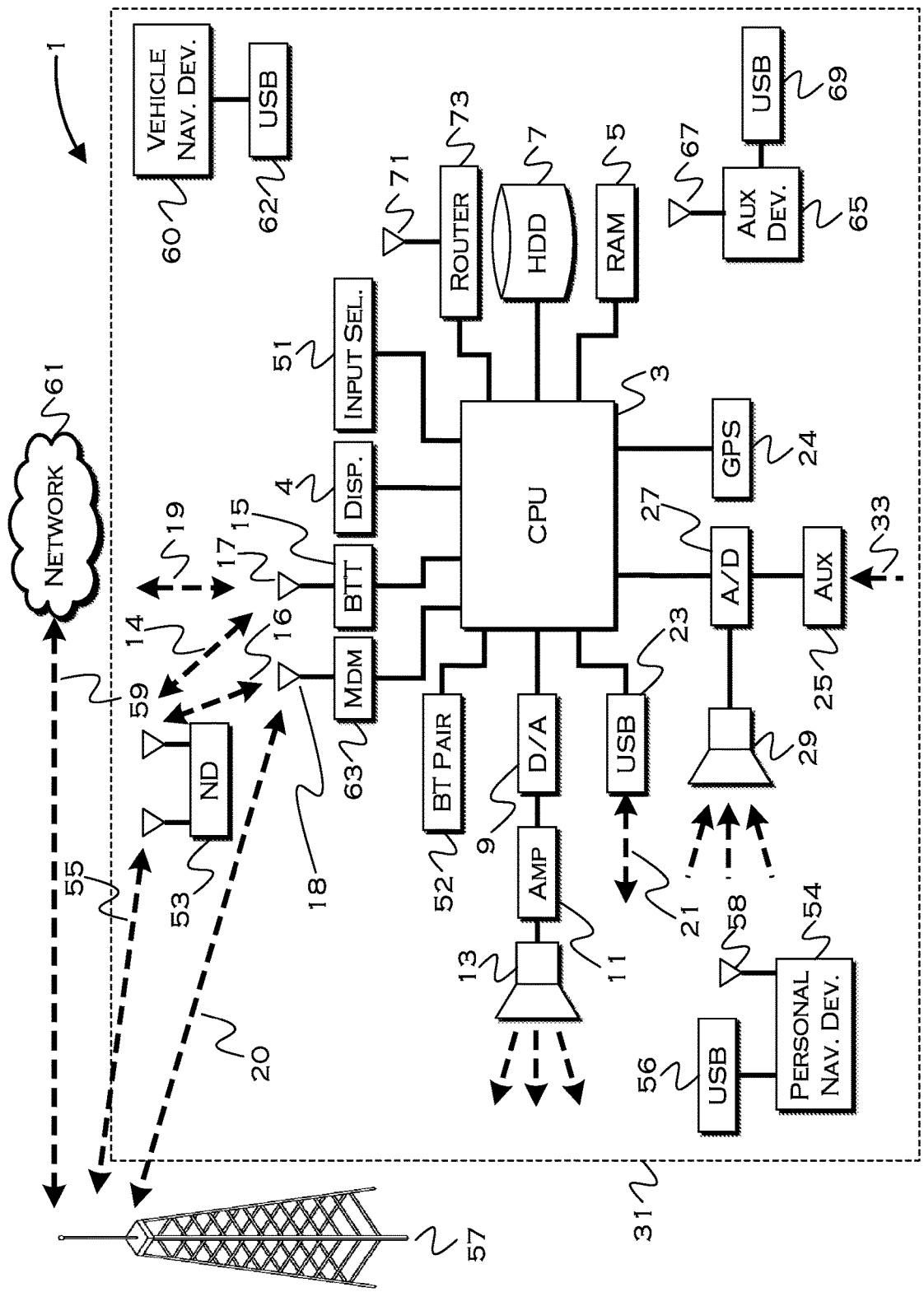
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While there is an incentive for an original equipment manufacturer (OEM) to include advanced and/or automatic driving and assistance modes, the OEM may have to temper these inclusions with considerations of a target demographic. That is, even if a person wants the full set of capabilities for themselves, they may be concerned about a teenage driver, for example, using a mode for which that driver does not have sufficient skill to use. Accordingly, if the options are either "include the mode" or "don't include the mode," OEMs may build and/or drivers may buy the option without all the modes, even though that may not be the precise version of the vehicle that they would prefer to sell or buy, respectively.

The illustrative embodiments allow for selective enablement of certain modes based on driver identification, which essentially allows an owner or primary account holder to customize which modes are available for which drivers. This allows the owner to experience all modes when they are driving, but also to restrict certain modes in a driver-specific manner.

In a similar sense, further examples allow owners to "force" or "block" certain modes based on environmental conditions, road conditions and other external considerations. For example, even though it may be less fuel efficient, an owner can force a vehicle into "snow" mode when ice or freezing temperatures are present, thus ensuring that certain drivers are driving in an environmentally appropriate mode. Similarly, the weather/external conditions can be a blocking trigger for certain modes, whereby the owner can block certain performance modes when inclement weather or other external conditions are undesirable for use of such a mode.

In addition to allowing for selective mode lock-out based on drivers and conditions, the illustrative embodiments provide for local and remote override of settings, so if a parent is in a vehicle and wants to teach a driver how to use an advanced driving mode, the lockout can be overridden without having to necessarily reconfigure the settings for the driver. The remote version of the override allows the primary owner or a designated party to use a mobile phone, PC, etc. to input a form of secure authorization, such as a code, PIN, biometric, etc., to override a lockout mode for a specific request. This could be useful, for example, if a driver had 20 miles of fuel remaining in a snow-mode, but would have 22 miles of fuel in a "normal" mode, and was driving in inclement weather but was also 21 miles from the nearest refueling point. By allowing an owner to override the lockout, the vehicle would have a better chance of reaching the refueling point, even though it would have to be driven in a sub-optimal mode for the current weather.

Figure 2:
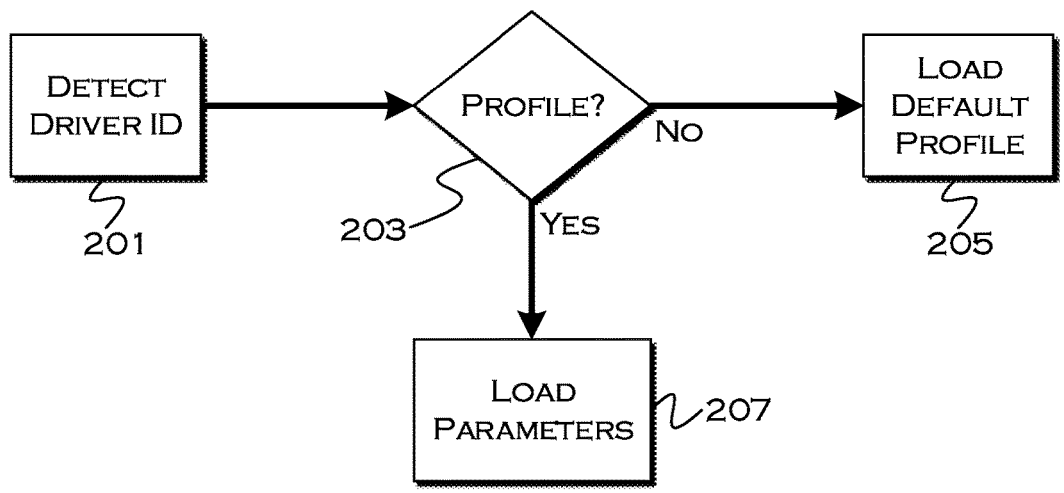
FIG. 2 shows an illustrative example of a process for driving mode availability engagement.

FIG. 2 shows an illustrative example of a process for driving mode availability engagement. In this illustrative example, the process may detect 201 a driver identification. Driver identification can be done in a variety of manners, such as, but not limited to, device based identification where the system identifies a driver based on a known device relationship, biometric identification (fingerprint, weight, height, etc), visual identification or even input of a specified username/password combination.

The process also determines 203 if there is a "mode profile" for the identified driver. That is, individual drivers or classes of driver may have owner-designated control and mode selection rights associated therewith. These rights do not actually have to be assigned by an owner, but they are rather assigned by an administrative user having control rights over a given profile and designated or permitted through passcode entry as an entity having permission to define and alter rights. If there is a defined profile for the driver, the process may load 207 parameters for that driver. These parameters may define both impermissible driving modes and driving modes that may be triggered under certain conditions (e.g., permitted under certain conditions or even automatically triggered under certain conditions). If there is no profile for a certain user (or if identification attempts result in an unknown user), the process may use 205 a default profile. The default profile can be customized to enable/disable certain driving modes, or may, for example, correspond to a specific profile having the lowest permission settings.

Figure 3:
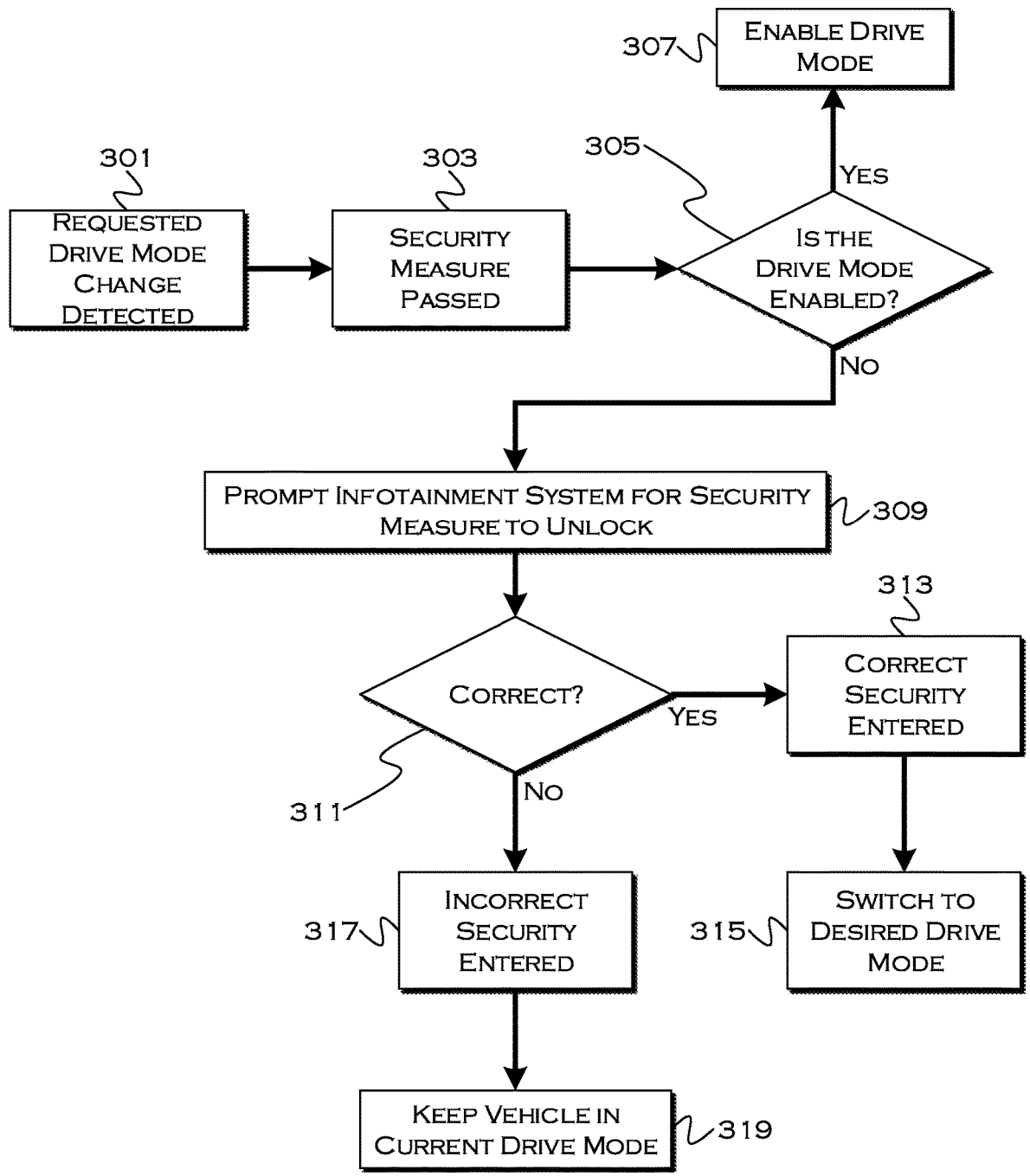
FIG. 3 shows an illustrative process for driving mode enablement and secured bypass.

FIG. 3 shows an illustrative process for driving mode enablement and secured bypass. In this illustrative process, the system determines 301 that a given driving mode is requested. There are varied methodologies for enabling/disabling driving modes that are usable with the illustrative embodiments. For example, the process may selectively enable or disable modes, which may include displaying certain modes for digital selection or illuminating or failing to illuminate dial settings during manual selection. In another example, the process may simply reject (and may possible include a rejection message) a certain mode request if a mode request is made for a mode that is denied to a certain identified driver. Once the system confirms 303 that any necessary security checks have cleared (e.g. PIN/password/secure authorization or driver identity verification), the process may further determine 305 if the driving mode is enabled for the identified driver. If the mode is permitted, the process may engage 307 the requested driving mode.

If the mode is not permitted, the process may provide 309 an override option, whereby the driver can enter an override PIN to enable an otherwise disabled mode. If the driver elects the override option and correctly 311 enters the pin, the system verifies 313 the PIN (or password) and engages 315 the requested driving mode. If the code or PIN is incorrect, the process may notify 317 the user that the incorrect code was entered and maintain 319 the current driving mode.

Since PIN/password entry, or other secure authorization, may require attention, the option to override via PIN entry may require the vehicle to be slowed or stopped, even if the driving mode change would otherwise engage during travel.

In another example, if the vehicle can detect or determine the identities of other occupants, and the system determines the presence of the approved primary control entity (such as an owner), then the process may provide an automatic override based on the assumption that the owner is present and therefore approves the requested override.

Figure 4:
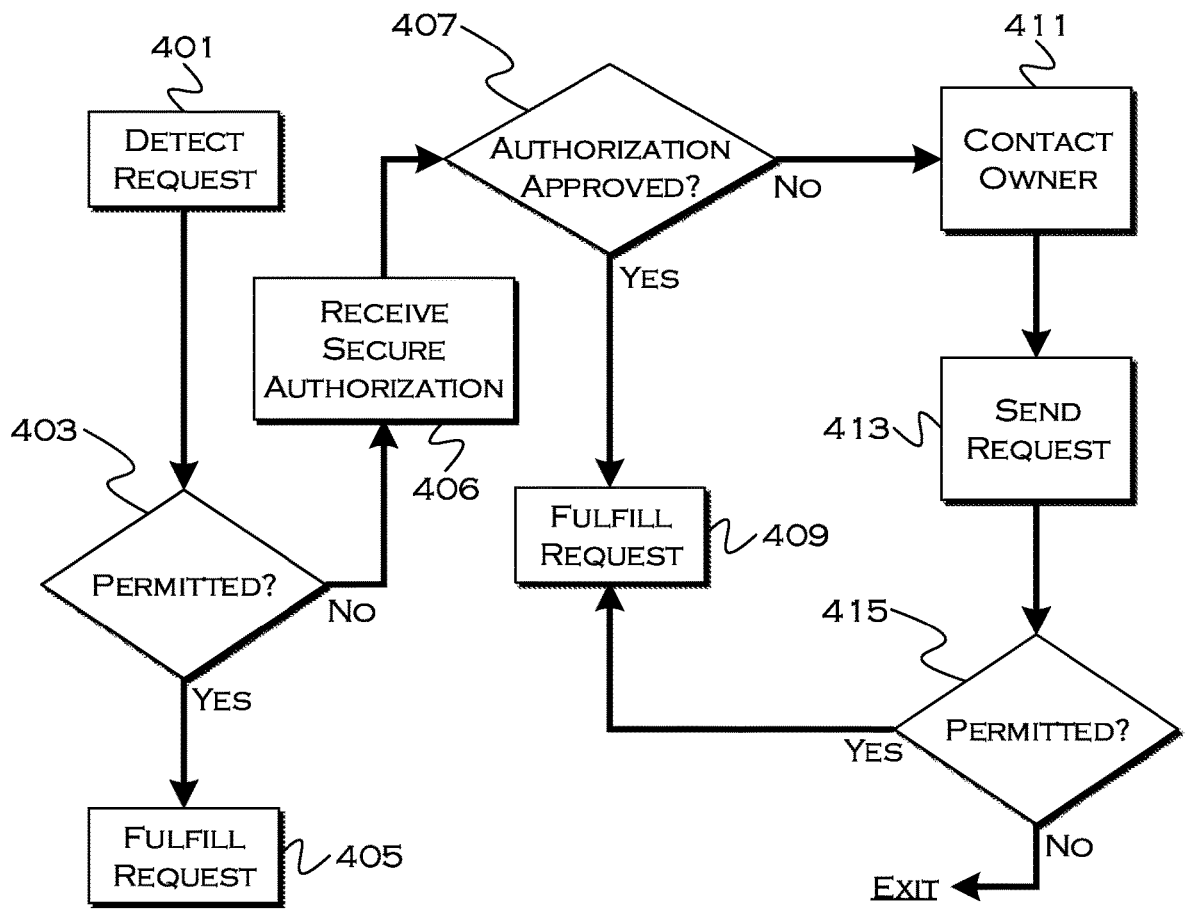
FIG. 4 shows an illustrative example of remote secured bypass.

FIG. 4 shows an illustrative example of remote secured bypass. In this example, the user may not be given an option to manually override denial of a drive mode, or, alternatively, an incorrect attempt may result in a remote request or an option for a remote request for override. In the override scenario, a message is sent to a primary designated user's contact point (e.g., mobile device or PC) whereby the primary user or other designated party can input a valid override PIN/code or override by other authorization (e.g., without limitation, biometric on a connected phone) and allow the vehicle to proceed with the requested drive mode change.

Here, the process detects 401 a request to change into a new drive mode, and if the mode is permitted based on a current driver profile 403, the process may simply engage 405 the requested driving mode.

If the mode is not permitted, however, the process may provide an option to input a PIN/code/authorization in order to override the denial. If the driver or other occupant responds with a valid 407 PIN or other authorization, the process may also engage 409 the requested mode, in light of the successful override request. If the driver cannot provide authorization, or if the driver is required to seek remote permission, the vehicle may contact 411 an owner and/or send 413 a request to a predefined contact number or address for remote approval.

An owner executing an OEM application or otherwise receiving the message can use a PIN or code, or may even simply confirm the request, since the device is presumably in the appropriate party's possession. Once the process receives the remote confirmation 415, the process can engage the requested mode.

In addition to tying configurable driving modes to driver profiles, it is also possible to tie modes to state dependencies and variables. This concept allows selective enablement of certain modes under certain conditions, and can further "force" the vehicle into certain modes under certain conditions. For example, a parent may be willing to allow a child to use drift mode, but only in dry conditions, and alternatively a parent may configure a snow-traction mode to be engaged whenever the vehicle is traveling in icy or freezing conditions. By tying the modes to variables other than driver identification, a greater degree of freedom can be achieved with regards to mode configuration.

Figure 5:
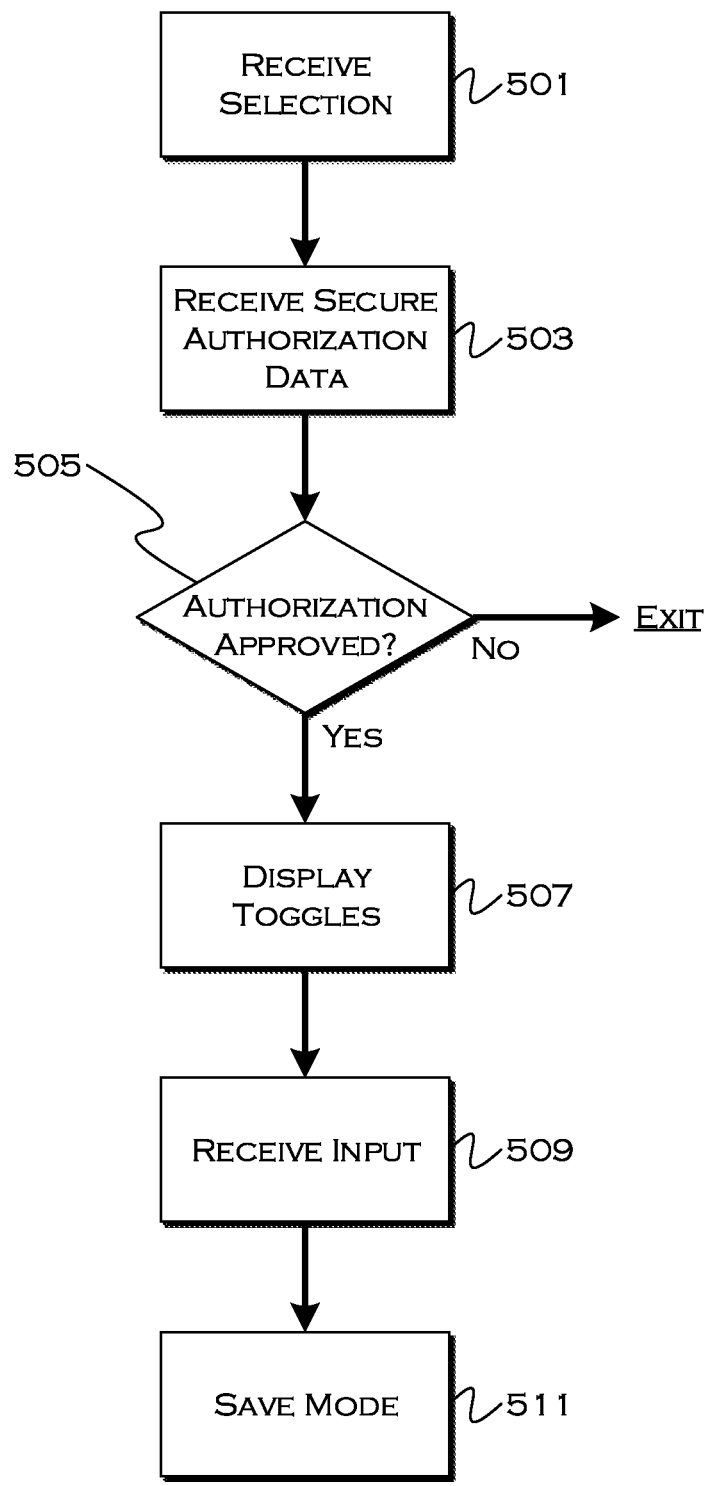
FIG. 5 shows an illustrative example of mode configuration.

FIG. 5 shows an illustrative example of mode configuration. This process allows a user to access a configuration state setup screen, which can present the user with a list of profiles, variables, variable settings and corresponding modes. Depending on the granularity of control desired, users may be able to input advanced variables and geofences for particular modes, and in other more simplified examples the user may simply tie certain modes to times of day or weather conditions.

In this example, the process receives 501 a configuration request, which will allow a user to configure states associated with driving modes. The request can be fulfilled from a mobile device or via a vehicle HMI, or any other remote HMI capable of relaying selections to a vehicle through a remote server or communicating selections directly to the vehicle via a wireless connection.

Since the driving mode configuration may allow access to modes that require certain skill levels, the process in this example requests 503 secure authorization (e.g., without limitation, a PIN, code, biometric, etc.). In other examples, the process may simply launch 507 the configuration interface, but in this example the launch is contingent on the correct secure authorization 505.

The process then receives 509 the input for the various conditionals or toggles. In this example, the states have toggle "on/off" switches associated therewith, and the each conditional may also have state settings associated therewith. For example, the process may present a snow conditional, for which the user can then engage particular states or disable states. The process also saves 511 the settings.

Figure 6:
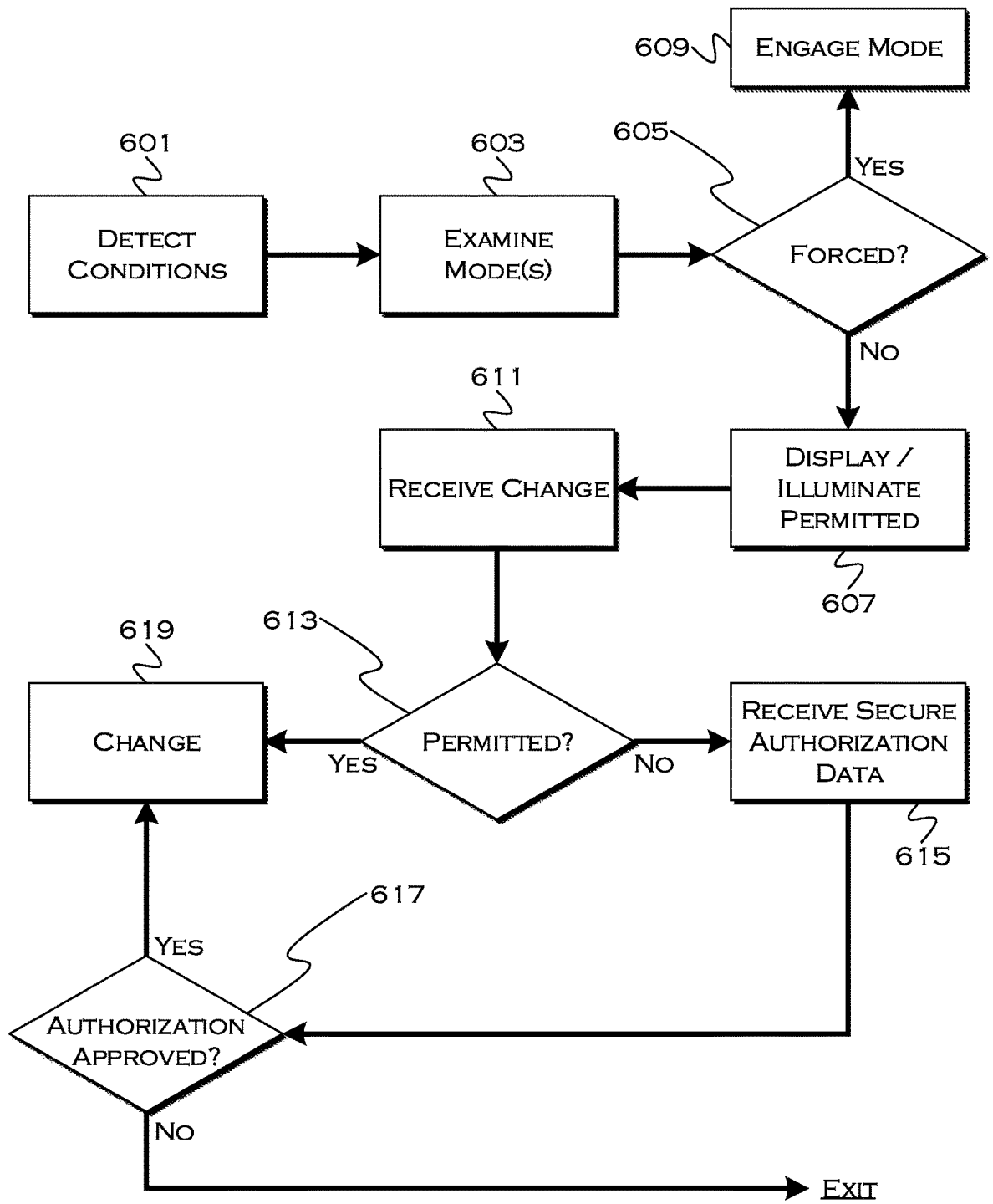
FIG. 6 shows an illustrative example of automatic mode engagement.

FIG. 6 shows an illustrative example of automatic mode engagement. In this example, the process detects 601 a weather, geographic or other condition associated with state change. For example, detecting rocky or off-road topology can result in engaging a mode predefined for such a condition and disabling selection of certain modes that are not designed for such a condition. The process determines 603 modes that are defined as associated with the detected condition. This may reveal that an owner has enforced a certain required 605 mode for a given condition (e.g., snow driving mode for freezing temperatures). If there are no mandated driving modes, the process may present options or illuminate 607 options corresponding to driving modes permitted under certain conditions.

OEMs may also predefine certain settings for certain conditions, so that even if a user has not configured modes for a particular condition, the system may default to recommended modes for a given condition. This will not necessarily prevent the user from enabling initially disabled modes, but it may guide the user towards OEM-designed modes for certain conditions. If a mode is mandated, the process may simply engage 609 the mandated mode.

If there is no mandated mode, but the user selects one of the enabled modes (selection of non-enabled or disabled modes being prevented), the process may receive 611 the change-mode instruction and ensure that the mode is permitted 613 for the user. If the user has attempted to select a disabled mode, the process may request 615 secure authorization before the selected mode can be enabled. If the correct authorization 617 is received, the process can engage 619 the selected, previously disabled, mode. It is also possible that a parent or owner "permanently" disables certain modes, so that only by reconfiguring the initial settings that mode can be selected. This option may be used to prevent accidental selection of disabled modes or more robust lockout of modes that are potentially undesirable for certain users under certain conditions.

Figure 7:
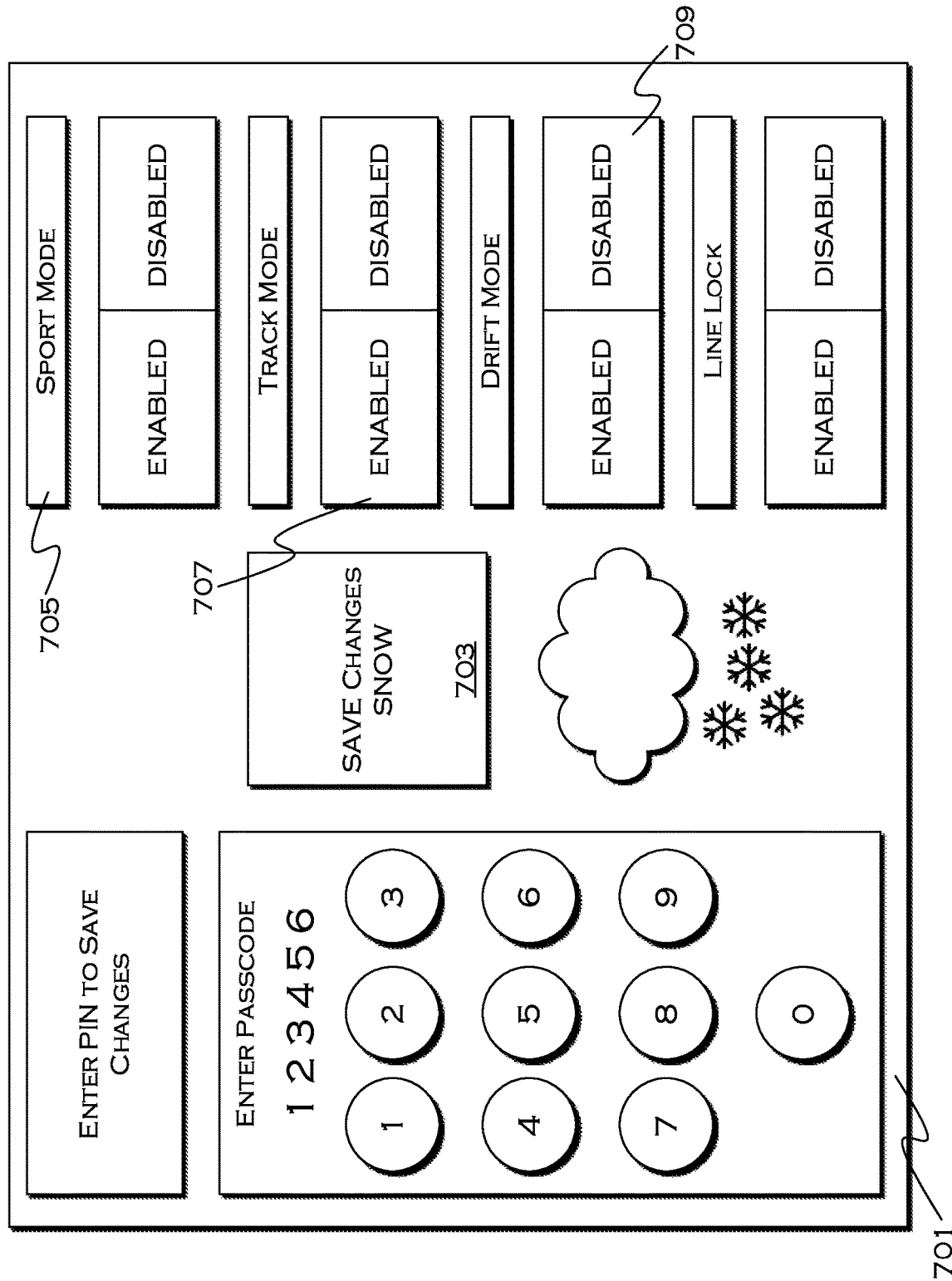
FIG. 7 shows an illustrative configuration display.

FIG. 7 shows an illustrative configuration display. This illustrative human machine interface (HMI) demonstrates an example input screen for configuring context-sensitive driving modes. In this example, the driver may be shown this display if, for example, an input request is made. That allows the driver to see the settings, but in order to change the settings, the driver may have to use the numeric keypad 701 to input a PIN. In the center, a "save" button 703 also includes the weather, environmental or other parameter associated with the displayed settings.

Here, there are a plurality of modes 705, which in this example include sport, track, drift and line lock. Each mode has a toggle 707, 709 that allows the driver to dictate whether a given mode should be enabled 707 or disabled 709 for a given environmental variable type.

Figure 8:
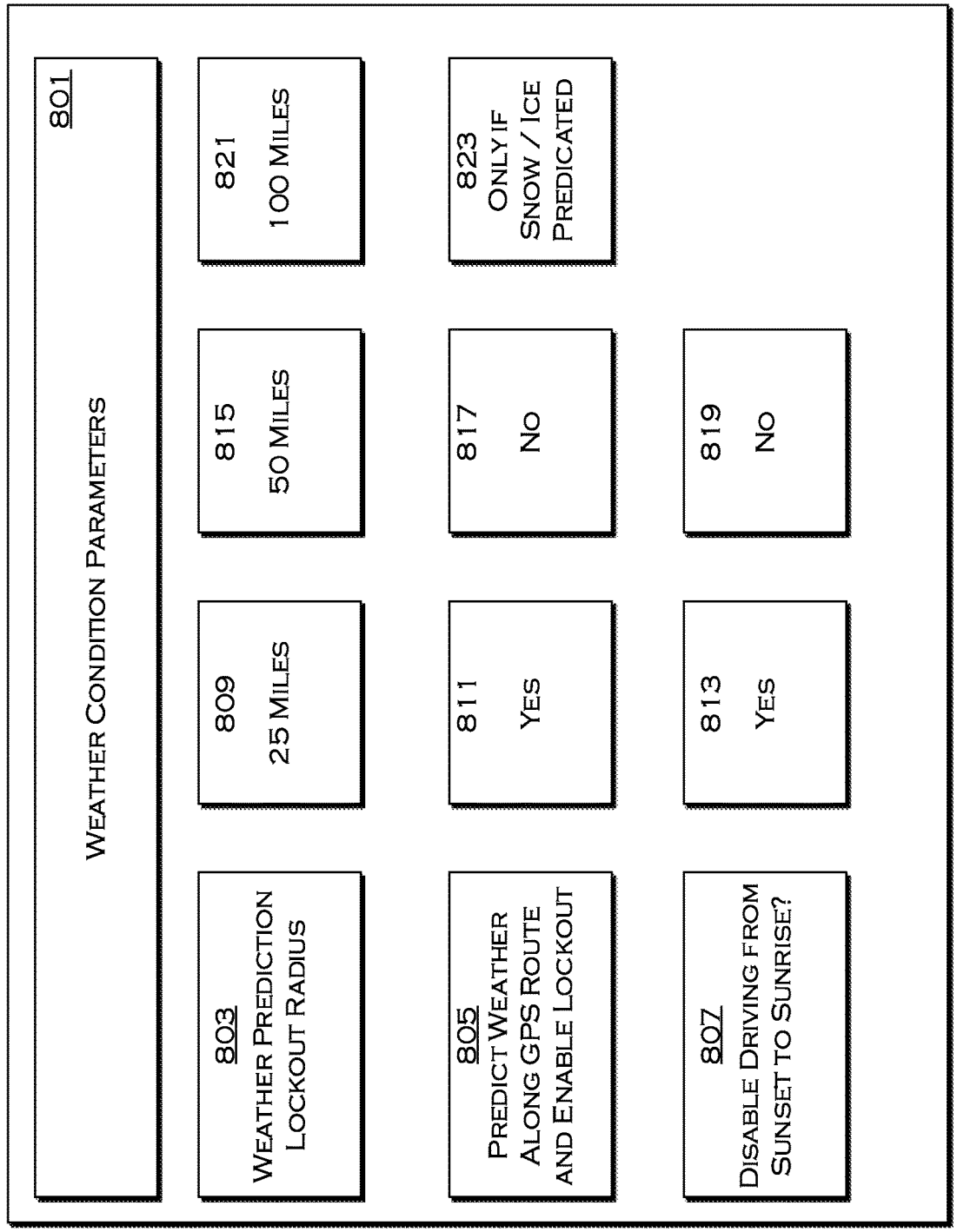
FIG. 8 shows an illustrative set of conditional parameters.

FIG. 8 shows an illustrative set of conditional parameters. This is an advanced set of features that could allow for secondary considerations. These are simply illustrative parameters, but they should provide examples of how secondary considerations can be set for implementation of various environmental conditions.

Accordingly, the process is capable of using weather prediction 803 in locales other than the current location, which in this example allows the user to configure predictions various radiuses away from a user location, such as 25 miles 809, 50 miles 815 and 100 miles 821. Weather predicted in a given radius may prevent mode usage corresponding to the predicted weather.

The user can also tie weather prediction to a current route 811, and elect whether to enable 811 or disable 817 this considerations with regards to weather types predicted along the route. In a further example, the process may only react if snow/ice 823 is predicted along the route, or if another "major" type of variable exists along the route.

Another variable in this example is daylight 807. Certain modes can be disabled/enabled during night-time or daytime. Again, the driver can elect to apply 813 the lockout mode or unapply 819 the lockout mode during the specified time period or under specified variable conditions. The screen may further include an OEM specified fixed set of enablable conditions or selection of a given condition 803, 805, 807 could provide a list of selectable options, and then the accompanying considerations 809, 811, 813, 815, 817, 819, 821, 823 relevant to a selected variable could be presented as possible options.

The illustrative embodiments allow for OEMs to provide vehicles with enhanced driving modes and allow drivers who wish to own these modes to ensure that unapproved parties are not using the modes, while at the same time allowing for selective unlocking of these modes under approved circumstances.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A vehicle system comprising:
   a processor configured to:
   detect a driver identity of a driver of the vehicle;
   load a profile associated with the driver identity, the profile at least including a defined set of disabled driving modes defined for an identified driver by a user with administrative rights to the vehicle;
   receive a request from the driver to change modes to a disabled driving mode;
   reject the request based on the disabled driving mode being defined as disabled for the identified driver in the profile; and
   present an override option responsive to rejecting the request.

2. The system of claim 1, wherein the processor is configured to:
   receive occupant input, corresponding to at least one of a saved PIN or biometric, in conjunction with selection of the override option; and
   process an override enabling a mode change to the requested disabled driving mode responsive to verifying the respective PIN or biometric.

3. The system of claim 1, wherein the processor is configured to wirelessly message a designated party responsive to selection of the override option.

4. The system of claim 3, wherein the processor is configured to receive a response from the designated party and responsively permit the mode change to the requested disabled driving mode.

5. The system of claim 4, wherein the response includes authentication information usable by the processor to validate the response.

6. The system of claim 1, wherein the processor is further configured to:
   detect a presence of at least one occupant approved for override; and
   override the rejection by changing a driving mode to the requested disabled driving mode based on having detected the presence.

7. A method comprising:
   detecting a driver identity of a driver of the vehicle;
   loading a profile associated with the driver identity, the profile at least including a defined set of disabled driving modes defined for an identified driver by a user with administrative rights to the vehicle;
   receiving a request from the driver to change modes to a disabled driving mode;
   rejecting the request based on the disabled driving mode being defined as disabled for the identified driver in the profile; and
   presenting an override option responsive to rejecting the request.

8. The method of claim 7, further comprising:
   receiving occupant input, corresponding to at least one of a saved PIN or biometric, in conjunction with selection of the override option; and
   processing an override enabling a mode change to the requested disabled driving mode responsive to verifying the respective PIN or biometric.

9. The method of claim 7, further comprising wirelessly messaging a designated party responsive to selection of the override option.

10. The method of claim 9, further comprising receiving a response from the designated party and responsively permitting the mode change to the disabled driving mode.

11. The method of claim 10, wherein the response includes authentication information usable to validate the response.

12. The method of claim 7, further comprising:
    detecting a presence of at least one occupant approved for override; and
    overriding the rejection by changing to the requested disabled driving mode based on having detected the presence.

13. A non-transitory computer-readable storage medium storing instructions that, when executed by a processor, cause the processor to perform a method comprising:
    detecting a driver identity of a driver of the vehicle;
    loading a profile associated with the driver identity, the profile at least including a defined set of disabled driving modes defined for an identified driver by a user with administrative rights to the vehicle;
    receiving a request from the driver to change modes to a disabled driving mode;
    rejecting the request based on the disabled driving mode being defined as disabled for the identified driver in the profile; and
    presenting an override option responsive to rejecting the request.

14. The storage medium of claim 13, the method further comprising:

receiving occupant input, corresponding to at least one of a saved PIN or biometric, in conjunction with selection of the override option; and processing an override enabling a mode change to the requested disabled driving mode responsive to verifying the respective PIN or biometric.

15. The storage medium of claim 13, the method further comprising wirelessly messaging a designated party responsive to selection of the override option.

16. The storage medium of claim 15, the method further comprising receiving a response from the designated party and responsively permitting the mode change to the disabled driving mode and wherein the response includes authentication information usable by the processor to validate the response.

17. The storage medium of claim 13, the method further comprising:

detecting a presence of at least one occupant approved for override; and overriding the rejection by changing to the requested disabled driving mode based on having detected the presence.

\* \* \* \* \*